June 2, 1925.  1,539,830

E. CULVER

MEANS FOR HOLDING LENSES AND THE LIKE

Filed May 31. 1924

INVENTOR:

EDWARD CULVER,
By his Attorneys,

Patented June 2, 1925.

1,539,830

UNITED STATES PATENT OFFICE.

EDWARD CULVER, OF PENTONVILLE, LONDON, ENGLAND, ASSIGNOR TO GEORGE CULVER, LIMITED, OF PENTONVILLE, LONDON, ENGLAND.

MEANS FOR HOLDING LENSES AND THE LIKE.

Application filed May 31, 1924. Serial No. 717,008.

*To all whom it may concern:*

Be it known that I, EDWARD CULVER, a subject of the King of Great Britain, residing at White Lion Street, Pentonville, London, England, have invented new and useful Improved Means for Holding Lenses and the like, of which the following is a specification.

This invention relates to means for holding lenses and the like.

According to this invention a lens is held between two rings whose inner peripheries are bevelled and so form a groove. The lens whose periphery is shaped to fit the groove is placed in the groove between the rings and the rings are secured together in any convenient manner, for instance, by a band similar to the eye wire of a spectacle frame.

The outer peripheries of the rings may also be bevelled and the band dished so that the rings are firmly held together.

The accompanying drawing illustrates means for holding lenses made in accordance with this invention.

Figures 2, 3:
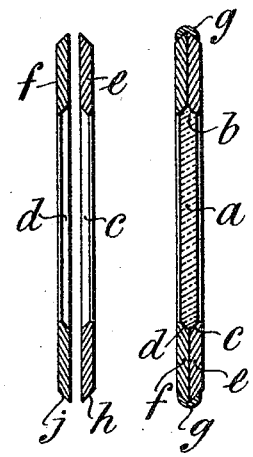
Figure 1:
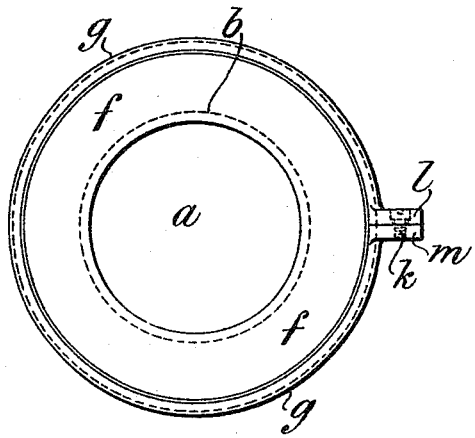

Figure 1 is a plan and Figure 2 a transverse section of the rings with the lens in place. Figure 3 is a section showing the two rings.

*a* is a lens having a bevelled periphery *b* which fits into a groove formed by the bevelled peripheries *c* and *d* of rings *e* and *f*. The rings *e* and *f* are held together by a trough-shaped band *g* which engages the bevelled peripheries *h* and *j* of the rings *e* and *f*, the two ends of the band *g* being held together by a screw *k* which connects together two lugs *l* and *m* on the band.

What I claim is:—

1. In an optical instrument, means for holding a lens consisting of two rings whose inner peripheries are bevelled forming surfaces to hold the lens by a wedging action and whose outer peripheries are bevelled forming surfaces by which the rings may be held together by a wedging action, and means for securing the rings.

2. In an optical instrument, means for holding a lens consisting of two rings whose inner peripheries are bevelled forming surfaces to hold the lens by a wedging action, a band engaging the outer peripheries, and means for securing the ends of the band together.

3. In an optical instrument, means for holding a lens consisting of two rings whose inner peripheries are bevelled forming surfaces to hold the rings by a wedging action and whose outer peripheries are bevelled forming surfaces by which the rings may be held together by a wedging action, a band engaging the outer peripheries, and means for securing the ends of the band together.

4. In an optical instrument, means for holding a lens consisting of two rings whose inner peripheries are bevelled forming surfaces to hold the lens by wedging action, a band engaging the outer peripheries, lugs on the band, and a screw connecting together the lugs.

5. In an optical instrument, means for holding a lens consisting of two rings whose inner peripheries are bevelled forming surfaces to hold the lens by a wedging action and whose outer peripheries are bevelled forming surfaces by which the rings may be held together by a wedging action, a band engaging the outer peripheries, lugs on the band and a screw connecting together the lugs.

6. In an optical instrument, the combination of a lens having a bevelled periphery, two rings whose inner peripheries are bevelled forming surfaces to fit the periphery of the lens and hold the same by a wedging action, and means for securing the two rings together.

7. In an optical instrument, the combination of a lens having a bevelled periphery, two rings whose inner peripheries are bevelled to fit the periphery of the lens and hold the same by a wedging action and whose outer peripheries are bevelled forming surfaces by which the rings may be held together by a wedging action, and means for securing the rings.

In testimony that I claim the foregoing as my invention I have signed my name this 16th day of May 1924.

EDWARD CULVER.